United States Patent [19]
Neumyer

[11] Patent Number: 6,101,570
[45] Date of Patent: Aug. 8, 2000

[54] METHOD AND APPARATUS FOR FAIR BUS ARBITRATION IN MULTIPLE INITIATOR SCSI SYSTEMS

[75] Inventor: Edward Joseph Neumyer, Groton, Mass.

[73] Assignee: Compaq Computer Corporation, Houston, Tex.

[21] Appl. No.: 09/123,712

[22] Filed: Jul. 28, 1998

[51] Int. Cl.[7] .............................. G06F 13/14; G06F 13/18
[52] U.S. Cl. .......................... 710/240; 710/244; 710/107; 710/111; 710/113; 710/36; 710/40
[58] Field of Search ..................................... 710/113, 240, 710/241, 244, 243, 107, 111, 40, 36

[56] References Cited

U.S. PATENT DOCUMENTS

| | | | |
|---|---|---|---|
| 5,487,170 | 1/1996 | Bass et al. ............................... | 710/244 |
| 5,623,672 | 4/1997 | Popat ..................................... | 710/240 |
| 5,796,732 | 8/1998 | Mazzola et al. ........................ | 370/362 |

*Primary Examiner*—Ario Etienne
*Attorney, Agent, or Firm*—William J. Kubida; Stuart T. Langley; Hogan & Bartson LLP

[57] ABSTRACT

A SCSI bus arbitration controller includes a hub to which each of the SCSI devices having access to the bus is connected. The hub includes a controller that monitors the data lines on the bus, as well as the BUSY and SELECT lines. The hub also includes a plurality of switches located between each of the devices and the data bus. For each set of device connections to a bus, the highest priority ID data line has a switch in it, as does the data line that corresponds to the ID associated with that particular device. During an initial arbitration cycle, the controller monitors the bus data lines, and determines which of the devices participate in the initial arbitration cycle. It then latches the identities of the participating devices in a register. Of the SCSI IDs of the system, the controller reserves the highest priority ID for itself. When the initial arbitration cycle is complete, it asserts the high priority ID, and opens the switches on the high priority ID line for each of the devices that participated in the initial arbitration. The non-participating devices therefore withdraw, and the remaining devices are allowed to arbitrate for control of the bus. In each subsequent arbitration, the device that gains control of the bus is thereafter prevented from arbitrating by closing its high priority ID data line switch until all of the other devices that participated in the initial arbitration have had access to the bus. The switch located in the data line for that device that corresponds to its own ID is also opened, to prevent it from being asserted against the other participating devices that did not yet gain access to the bus.

28 Claims, 4 Drawing Sheets

METHOD AND APPARATUS FOR FAIR BUS ARBITRATION IN MULTIPLE INITIATOR SCSI SYSTEMS

FIELD OF THE INVENTION

This invention relates to data transfer systems that have multiple initiators connected to a single data bus and, more specifically, to arbitration schemes for controlling such a bus, particularly when the bus is a small computer system interface (SCSI) bus.

BACKGROUND OF THE INVENTION

In systems that use a common data bus for transmitting data between an initiator device and any of a number of target devices, it is often necessary to control which of the devices has access to the data bus at any point in time. Providing such control typically requires arbitration between the devices to determine which of them gets control in a given instance. A conventional form of arbitration involves assigning each of the devices a permanent ID value, which gives it a particular priority relative to the other devices connected to the bus. Thereafter, if there is contention for control of the bus, the device with the highest priority ID value wins the arbitration. The other devices withdraw from contention, giving the high priority device control of the bus.

The permanent ID method of arbitration has been successful in the past, due primarily to the fact that only one initiator was typically connected to a given bus. That is, in most systems, only one of the devices attached to the bus was an initiator, and could make data requests to the other devices of the system. While the other devices would make data transfers in response, and therefore required the ability to arbitrate periodically for control of the bus, the single-initiator nature of the system made any contentions for the bus manageable. Thus, the permanent priority ID values assigned to the different devices provided a satisfactory system. However, more recently, SCSI buses have been configured with more than one initiator connected to them at a time. This creates a situation in which different initiators may be simultaneously trying to send and receive data on the same bus at the same time. As a result, more frequent contentions occur and, if the bus is particularly busy, the use of a permanent ID system can result in the devices with lower priority IDs being continuously blocked from access to the bus. It is therefore an object of this invention to provide a fair arbitration mechanism for data bus control, particularly when it is a SCSI bus, and to there by prevent the "starving-out" of devices that are assigned a low arbitration priority.

SUMMARY OF THE INVENTION

The present invention provides a fair arbitration system that gives devices seeking control of a data bus more equal access by periodically storing the ID values of arbitrating devices, and servicing all of the devices with stored a IDs before again opening the bus to general arbitration. The system applies to parallel data bus architectures and, particularly, to SCSI bus architectures and the rules which apply to their operation. A hub contains the bus and is connected to each of the devices operating on the bus. The hub also includes a controller that monitors the initial arbitration cycle of the bus to determine which of the devices participate. Those devices that participate in the initial arbitration cycle have their identities stored, preferably by latching their ID values using a flag register within the hub. In subsequent arbitrations, the devices that did not participate in the initial arbitration, i.e., the "non-participating" devices, are prevented from winning the arbitration and gaining control of the bus. One o f the "participating" devices is therefore ensured of winning the subsequent arbitration. As each of the participating devices gains control of the bus, its identity is cleared from the register, and it is thereafter prevented from winning any other subsequent arbitrations until all of the other participating devices have gained access to the bus.

To block the non-participating devices from gaining control of the bus as a result of the subsequent arbitrations, the hub controller makes use of the priority ID system of the SCSI standard. Of all the available IDs, which correspond to the assertion of data lines on the bus during the arbitration phase of the arbitration cycle, it reserves the highest priority ID for itself. After the initial arbitration, it asserts the high priority ID to cause the non-participating devices to concede the bus in subsequent arbitrations. To prevent the participating devices from also withdrawing, switches are provided in the data line connectors leading from the bus to each of the devices, one in the high priority data line leading to each device. The controller is able to switch these switches. Following the initial arbitration, the high priority data line switch for each of the participating devices is opened, thereby preventing them from receiving the high priority ID asserted by the controller.

As each participating device gains access to the bus as a result of a subsequent arbitration, the controller closes the high priority data line switch for that device, thus asserting the high priority ID against it. To ensure that the ID of that device is not asserted in any other subsequent arbitrations, the invention provides a switch in the data line for each of the devices that corresponds to its own ID. That switch is opened for a participating device after it has had access to the bus as a result of a subsequent arbitration. Thus, a device that has succeeded in gaining bus access in a subsequent arbitration cannot thereafter assert its ID in the remaining subsequent arbitrations, and the remaining participating devices are free to arbitrate unimpeded.

DETAILED DESCRIPTION OF THE PREFERRED EMBODIMENT

Figure 1:
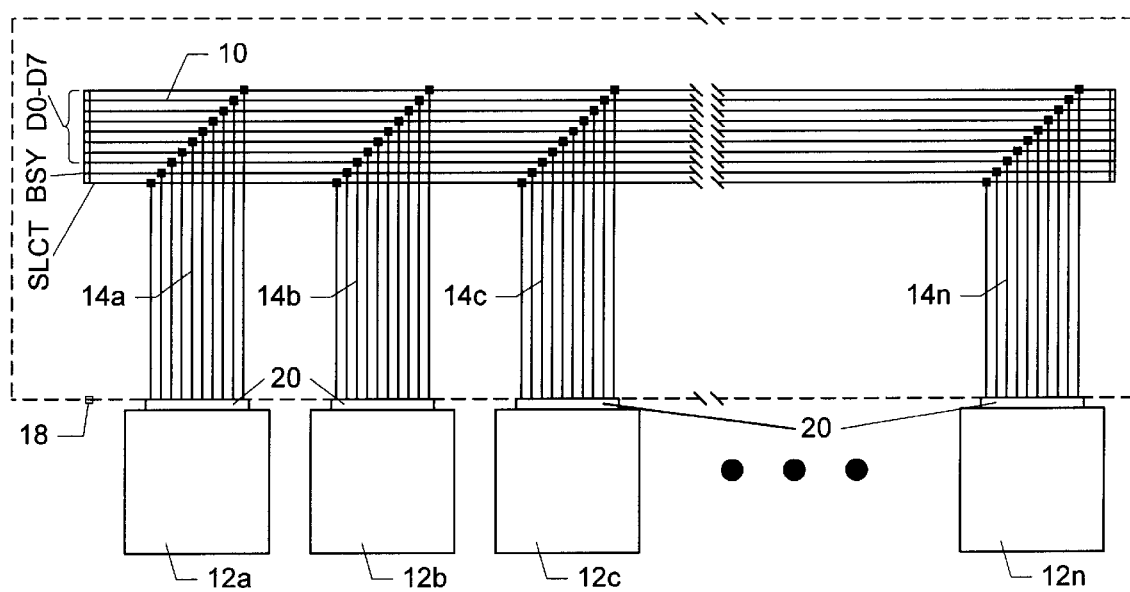
FIG. 1 is a schematic view of a SCSI bus arrangement in which a hub according to the present invention is used to provide fair bus arbitration.

Shown in FIG. 1 is a schematic depiction of a typical SCSI data bus 10 to which are connected a number of devices 12a–12n, each of which is capable of transmitting data. The devices connect to the bus 10 via connectors 20. The devices 12a–12n may be either initiators (which initiate a data transfer from themselves or from other devices) or targets (which transmit data in response to a data request from an initiator). These devices may include one or more host computer and peripheral devices such as disk drives, printers, tape drives and the like. Each is also outfitted with a SCSI controller that allows it to interface with the bus 10 in a manner that conforms with SCSI standards.

The bus 10, and the connectors 14a–14n to each of the devices 12a–12n, are each parallel eight-bit data paths.

Thus, a system as shown in the figure allows eight-bit SCSI data communication. However, it will be understood by those skilled in the art that an eight-bit data width is used herein for descriptive purposes only, and the invention is completely adaptable to any data width, in particular sixteen-bit wide data paths. Furthermore, the figure shows only ten electrical conductors for each of the bus and the bus connectors. In actuality, the SCSI bus and connectors will have many more electrical paths. For ease of description, however, the conductors shown in the figures are limited to eight data lines, the BUSY line (identified in the figures by the label "BSY") and the SELECT line (identified in the figures by the label "SLCT"). Those skilled in the art will recognize that the other standard SCSI conductors would be included in the physical embodiment of the invention.

The bus 10 and connectors 14a–14n are part of a SCSI "hub" 18. SCSI ports 20 provide the necessary connection between the devices 12a–12n and the hub 18. The connectors 14a–14n are preferably isolated portions of the hub 18, each of which connects a respective device 12a–12n to the bus 10.

Figure 2:
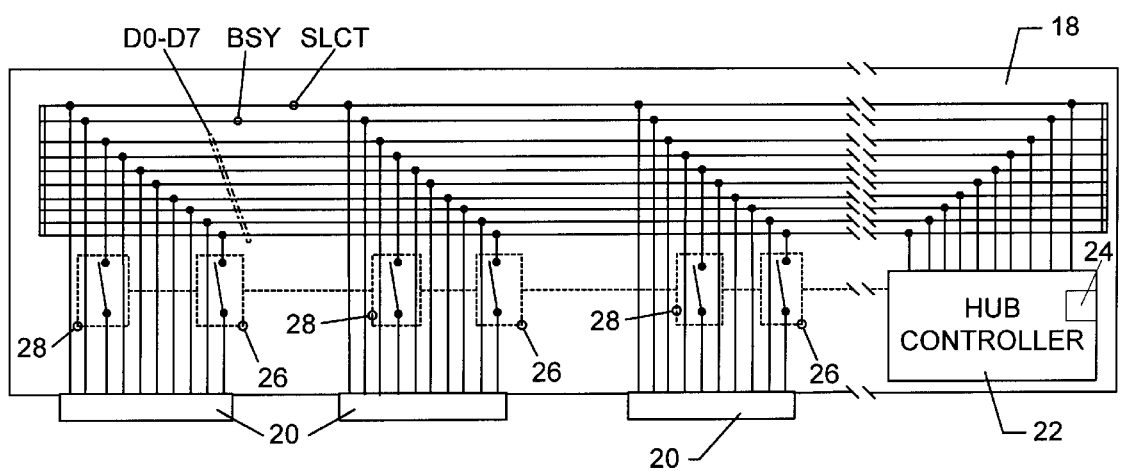
FIG. 2 is a schematic view showing some of the internal components of the hub shown in FIG. 1.

A more detailed schematic view of a relevant portion of the hub 18 is shown in more detail in FIG. 2. As shown, each of the electrical connections of the data path from each device passes through the hub 18 to the bus 10. Also shown is a hub controller 22 that resides in the hub and has a connection to each of the data lines of each device, as well as one to each of the BUSY and SELECT lines. The controller 22 also controls a series of switches 26, 28 which are placed in particular relation to the data lines for each device 12a–12n. In a manner described in more detail below, the controller 22 uses these switches to control the arbitration between the devices 12a–12n for control of the SCSI bus 10.

The invention is compatible with standard SCSI arbitration protocol, such as that defined by the most recent "ANSI SCSI-2 standard," including variations such as "Ultra SCSI" (also called Fast-20) and "Ultra2" (also called Fast-40). The invention may therefore be easily retrofit to existing SCSI systems, and should be compatible with future SCSI standards as well.

As is well known in the art, SCSI devices arbitrate for control of a SCSI bus using a predetermined arbitration cycle. In a first phase (the "arbitration" phase), a device seeking control of the bus asserts the BUSY line of the bus, as well as asserting the data line corresponding to its own SCSI ID. Since each of the devices is assigned an ID that corresponds to a particular one of the data lines of the bus, the assertion of the appropriate data line by a first device indicates to the other devices that the first device is seeking control of the bus. If more than one device asserts its ID during the arbitration phase, the bus is determined to be in contention. However, each device has an absolute priority based on its ID number, which corresponds to the particular data line it asserts during the arbitration phase. The SCSI controller for each device examines all of the data lines during the arbitration phase, and if there are any asserted that have a higher priority than its own, it will withdraw its assertion of the BUSY line and its ID data line. Thus, after all of the lower priority devices contending for the bus have withdrawn, the device with the highest priority has control, asserts the SELECT line, and goes on to establish the desired data communications in a known manner.

The hub controller 22 is connected to the data lines of the bus. During the time the arbitration phase is in progress, it also monitors the BUSY and SELECT lines. The controller can therefore identify all of the devices that have asserted an ID during the arbitration cycle, and it intervenes to ensure that none of the devices are "starved out" by repeated selection of higher priority ID nodes. To do this, the controller 22 makes use of a storage device, such as a flag register 24, within which the controller may keep a record of all the devices that assert IDs during the arbitration phase. That is, a different flag is latched in the flag register 24 by the controller for each of the devices that asserts an ID during the arbitration phase. The controller then uses the information in the register to prevent other devices, i.e., devices that did not assert an ID during the initial arbitration phase, from succeeding in subsequent arbitration cycles, until the devices for which IDs were latched in the register have all had access to the bus.

Preventing non-participating devices from succeeding in subsequent arbitrations is accomplished using the SCSI priority rules themselves. Out of all of the available SCSI IDs, the controller retains the highest priority ID (typically ID "7") for itself. It can then cause any of the devices to concede control of the bus during a contention by asserting the appropriate data line, and ensuring that only certain devices receive the ID. In order to apply selectively the high priority ID to only certain devices, the hub makes use of switches 26 to allow the ID to be received by some of the devices, while preventing it from being received by other devices. In FIG. 2, the priority of the data lines in the connectors 14a–14n shown for each device increases toward the right side of the page. That is, the rightmost data line shown corresponds to the highest priority ID. As depicted in the figure, within the hub 18, the rightmost data line for each of the devices contains a switch 26. Since this is the high priority ID data line, control of the switches 26 by the hub controller 22 allows it to issue the high priority ID, and then direct it to a selected group of devices.

In the preferred embodiment, the switches 26 used by the hub are semiconductor switches, such as CMOS transistor structures. However, the specific structure of the switches 26 may vary, provided the mechanism used allows the passage of data along one of the data lines particular to a given one of devices 12a–12n to be selectively blocked by the controller 22. For example, a means for controlling data flow on individual data lines might be built into the ports 20 themselves, or even be selectable within the SCSI controllers of each device 12a–12n.

Also shown in FIG. 2 is an additional switch 28 for each of the devices that is used by the hub 18. Each of these switches 28 is located in a data line that corresponds to the ID for the device in question. For example, the device 12a is assigned the ID corresponding to the first (i.e., leftmost) of the data lines, and a switch 28 in the hub is therefore positioned to interrupt the first data line for device 12a. Likewise, the second data line for device 12b is interrupted by a switch 28, since the ID for that device corresponds to asserting the second data line. The purpose of these additional switches 28 is to allow the controller not only to control which devices receive its high priority ID, but to also control which of the devices 12a–12n is able to assert its own ID on the bus at any given point in time. The steps followed by the controller to control the arbitration are described below in conjunction with the flowchart of FIGS. 3A and 3B.

Figure 3A:
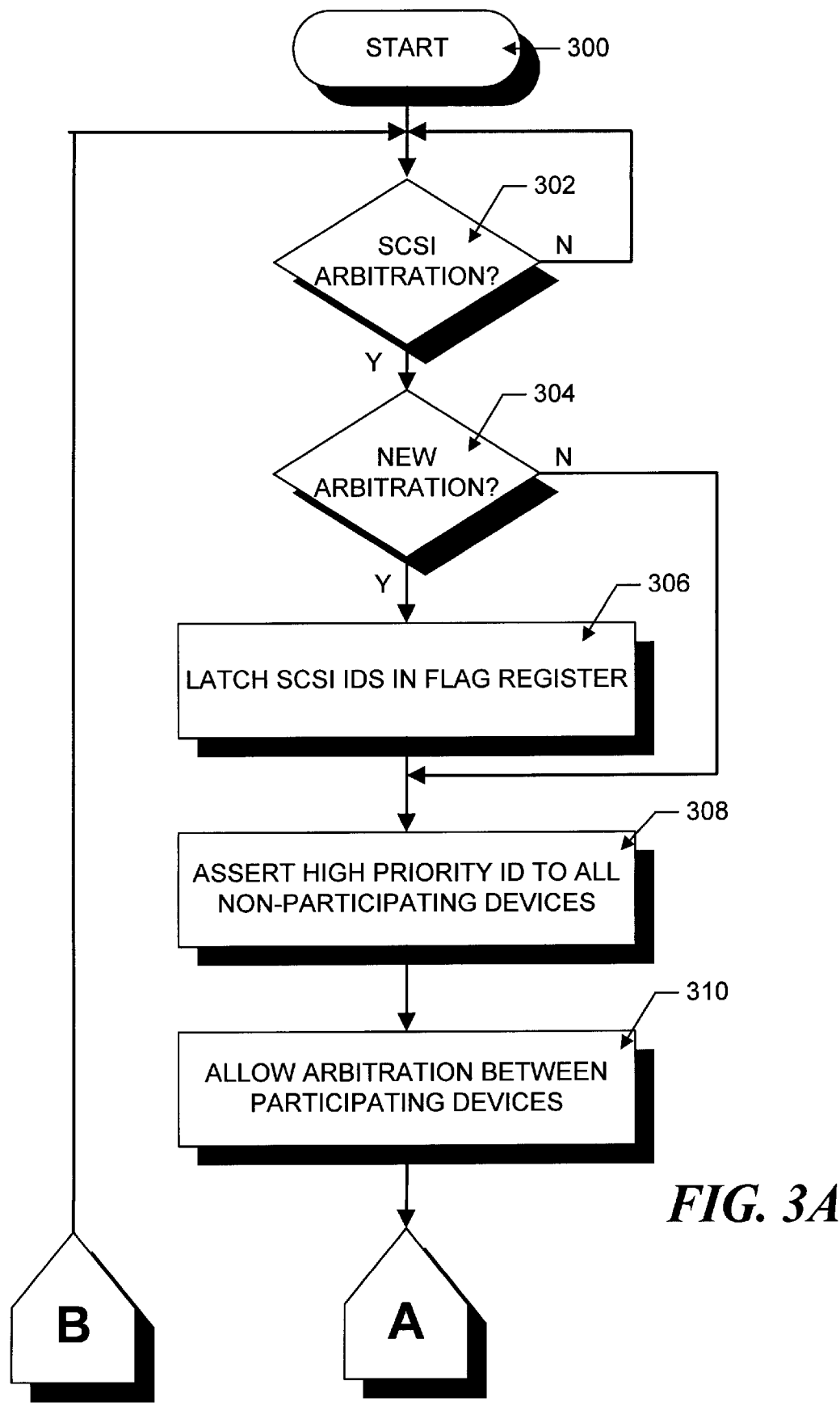
FIGS. 3A and 3B, when placed together, depict a flowchart showing the steps followed during the control of SCSI bus arbitration in accordance with the present invention.
Figure 3B:
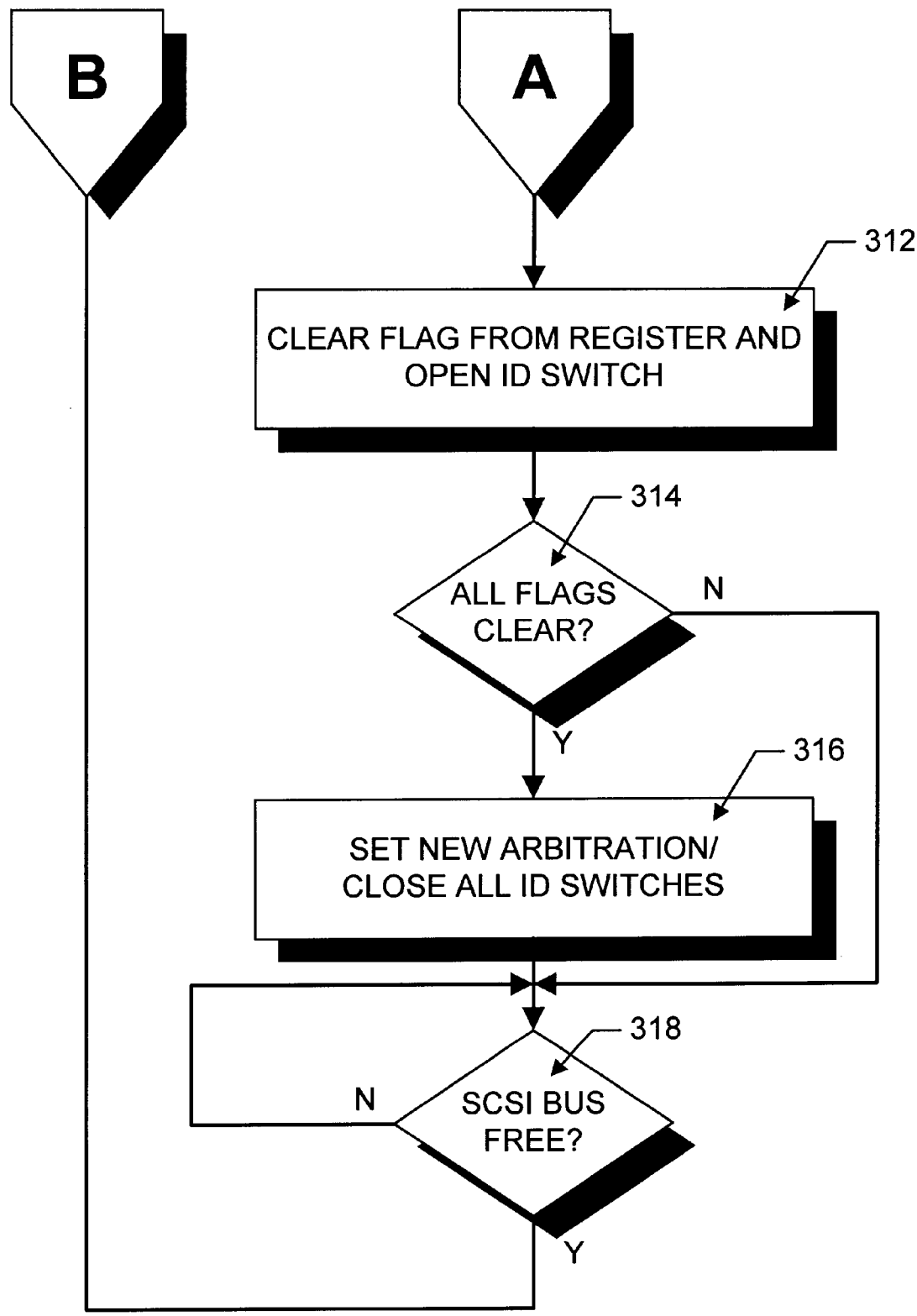

The routine begins in step 300 of FIG. 3A, and proceeds to step 302, in which the controller 22 continually examines the data lines to determine whether an arbitration cycle has begun. Once it detects an arbitration cycle, it proceeds to step 304, in which it determines whether the arbitration cycle is a "new" arbitration cycle, that is, whether all of the devices that participated in a previous arbitration cycle have had access to the bus. The controller makes this determination by examining the flag register 24. After each device has had access to the bus, the controller clears its respective flag from the flag register 24. Thus, if there are any flags in the register 24 that are still set when the controller comes to step 304 in the flowchart as shown, it indicates that other devices from a previous arbitration have yet to have had access to the bus. In such a case, the controller 22 bypasses step 306, and proceeds directly to step 308, in which the highest priority device still contending for the bus is given bus access. However, if the arbitration is a new arbitration, the controller 22 proceeds to step 306.

In step 306, the controller latches into the flag register all of the SCSI IDs presently participating in the arbitration. That is, a flag in the register is set for each of the devices that were identified by the controller 22 as having asserted their ID during the detected arbitration cycle. The controller then asserts its ID on the data bus, while preventing that ID from reaching the participating devices (i.e., those with their IDs latched) by opening the appropriate switch 26 for each of them (step 308). The devices are then allowed to arbitrate in step 310, such that the device with the highest priority ID of those that had its ID latched gains control of the SCSI bus. The routine is continued in FIG. 3B, with connectors "A" and "B" in the figures showing points of continuity between the two figures. In step 312, the controller 22 clears from the flag register the flag of the device that prevailed in the arbitration of step 310, and opens the switch 28 on the data line leading to that device that corresponds to its own ID. This ensures that the winning device will not again assert its ID on the bus while the devices enter subsequent arbitrations.

In step 314, the controller determines whether all of the flags of the flag register have been cleared. If so, it will set a "new arbitration," that is, it will reset itself so that, during the next arbitration, any of the devices will be allowed to participate. This includes closing all of the switches 28 that had been previously opened to prevent a once-participating device from reasserting its ID before the other participating devices had use of the bus. However, if any of the flags are still set in step 314, the controller skips step 316, and proceeds directly to step 318 without setting the new arbitration. In step 318, the controller checks the bus to determine whether it is free, i.e., whether another arbitration can take place. If the bus is not yet free, the controller will remain at step 318 until it becomes free. Once the bus is free, the controller proceeds back to step 302, where the routine begins again.

It can be seen that by using the flag register and the switches 26, 28 of the hub 22 in the manner described above, all of the devices that participate in a given arbitration cycle are given access to the bus before the other, non-participating devices are allowed to succeed in a subsequent arbitration. This ensures a fair selection process for granting access to the SCSI bus, and ensures that none of the devices are prevented from accessing the bus for an extended period of time due to a relatively low ID priority. While the description above is specific to an eight-bit data bus, it will be understood that the same principles may be applied regardless of the number of data lines used by the SCSI bus. Moreover, while the figures show only some of the devices 12a–12n and a portion of the hub 22, the remainder of the structure will be readily apparent to one skilled in the art given the description and the figures herein.

While the invention has been shown and described with reference to a preferred embodiment thereof, it will be recognized by those skilled in the art that various changes in form and detail may be made herein without departing from the spirit and scope of the invention as defined by the appended claims. The invention takes an initial arbitration process and improves on it by expanding it into multiple arbitrations. By controlling which of the devices can succeed in the different stages of arbitration, a new level of flexibility is provided that allows the system to prevent the starving out of any of its devices. The preferred embodiment described above refers to a protocol in which all of the initially participating devices are satisfied before non-participating devices are allowed to succeed in a later arbitration. However, those skilled in the art will recognize that the additional level of control provided by the invention is as equally applicable to other priority schemes. For example, if one was concerned with the higher priority ID devices languishing while the subsequent arbitrations were taking place, the total number of subsequent arbitrations could be limited. The controller could also respond differently to the IDs that were involved in the subsequent arbitrations. In short, within the scope of monitoring the initial arbitration and thereafter controlling the success in a subsequent arbitration or arbitrations, the variations on the invention are numerous.

What is claimed is:

1. A method of conducting arbitration for control of a parallel data bus between a plurality of devices which are connected to the bus and which are capable of gaining control of, and transmitting data over, the bus, each device having a relative priority associated therewith, the method comprising:

monitoring an initial arbitration cycle on the bus to determine which of the devices participate in the initial arbitration cycle; and preventing devices that did not participate in the initial arbitration cycle from gaining control of the bus as a result of a subsequent arbitration cycle irrespective of the priority of the devices that did not participate relative to the devices that did participate.

2. A method according to claim 1 further comprising monitoring the subsequent arbitration cycle, determining the identity of a first device which gains control of the bus as a result of the subsequent arbitration cycle, and preventing the first device from participating in an arbitration cycle following the subsequent arbitration cycle.

3. A method according to claim 1 further comprising allowing each of the devices that participated in the initial arbitration cycle to gain control of the bus before any non-participating device gains control of the bus.

4. A method according to claim 1 further comprising storing an indication of the identity of each of the devices that participated in the initial arbitration cycle.

5. A method according to claim 4 wherein storing an indication of the identity of each of the devices that participated in the initial arbitration cycle comprises storing the indications in a flag register.

6. A method according to claim 4 wherein, following the initial arbitration cycle, only the devices with an indication of their identity stored are gain control of the bus as a result of a subsequent arbitration cycle, and each time one of the devices which participated in the first arbitration cycle gains control of the bus in a subsequent arbitration cycle, the indication of its identity is no longer stored.

7. A method according to claim 1 wherein each of the devices has associated with it a different predetermined ID value, and assertion of an ID value to a first device that is associated with an ID value having a lower priority than the asserted ID value results in the first device withdrawing from contention for the bus, and wherein preventing devices that did not participate in the initial arbitration cycle from gaining control of the bus as a result of a subsequent arbitration cycle comprises asserting a high ID value of higher priority than that associated with any device to all of the devices that did not participate in the initial arbitration.

8. A method according to claim 7 wherein ID values are asserted on the data lines of the bus, and the method further comprises controlling the data lines connecting the devices to the bus so as to selectively prevent the high ID value from reaching devices that participated in the initial arbitration.

9. A method according to claim 8 further comprising, following each subsequent arbitration after the initial arbitration, thereafter allowing the device that gains control of the bus as a result of that particular arbitration to receive the high ID value.

10. A method according to claim 8 further comprising using switches in the data lines connecting each device to the bus to prevent or allow the high ID value from reaching that device.

11. A method according to claim 10 wherein the assertion of one of the data lines corresponds to the assertion of one ID value and, for each device, one of the data lines connecting that device to the bus is the high priority data line which, when asserted, corresponds to assertion of the high ID value to that device, and wherein the method further comprises locating a switch in the high priority data line of each set of data lines connecting each respective device to the bus.

12. A method according to claim 8 further comprising controlling the data lines connecting the devices to the bus so as to selectively prevent from reaching the bus an ID value asserted by a device that has gained access to the bus as a result of a subsequent arbitration, until all of the devices that participated in the initial arbitration have had access to the bus once following the initial arbitration.

13. A method according to claim 12 wherein the assertion of one of the data lines corresponds to the assertion of one ID value and, for each device, one of the data lines connecting that device to the bus is the self ID data line which, when asserted, corresponds to assertion of that device's own ID value to the bus, and wherein the method further comprises locating a switch in the self ID data line of each set of data lines connecting each respective device to the bus.

14. A method of conducting arbitration for control of a parallel data bus between a plurality of devices which are connected to the bus and which are capable of gaining control of, and transmitting data over, the bus, each of the devices having associated with it a different predetermined ID value, wherein assertion of an ID value to a first device that is associated with an ID value having a lower priority than the asserted ID value results in the first device withdrawing from contention for the bus, the method comprising:

monitoring an initial arbitration cycle on the bus to determine which of the devices participate in the initial arbitration cycle;

asserting a high ID value of higher priority than that associated with any device to all of the devices that did not participate in the initial arbitration;

controlling the data lines connecting the devices to the bus so as to selectively prevent the high ID value from reaching devices that participated in the initial arbitration; and following any subsequent arbitration after the initial arbitration, thereafter allowing a device that gains control of the bus as a result of the subsequent arbitration to receive the high ID value.

15. A method according to claim 14 wherein the method for conducting arbitration for control of a parallel data bus comprises a method for conducting arbitration for a SCSI data bus.

16. A parallel data bus arbitration apparatus for conducting arbitration for control of a parallel data bus between a plurality of devices which are connected to the bus and which are capable of gaining control of, and transmitting data over, the bus, each device having a relative priority associated therewith, the apparatus comprising:

a monitoring apparatus which monitors an initial arbitration cycle on the bus and determines which of the devices participate in the initial arbitration cycle; and a device inhibiting apparatus which prevents devices that did not participate in the initial arbitration cycle from gaining control of the bus as a result of a subsequent arbitration cycle irrespective of the priority of the devices that did not participate relative to the devices that did participate.

17. An apparatus according to claim 16 wherein the monitoring apparatus determines the identity of a first device that gains control of the bus as a result of the subsequent arbitration cycle, and the device inhibiting apparatus prevents the first device from participating in an arbitration cycle following the subsequent arbitration cycle.

18. An apparatus according to claim 16 wherein the device inhibiting apparatus allows each of the devices that participated in the initial arbitration cycle to gain control of the bus before any non-participating device gains control of the bus.

19. An apparatus according to claim 16 further comprising a memory storage apparatus which stores an indication of which devices participate in the initial arbitration.

20. An apparatus according to claim 16 wherein each of the devices has associated with it a different predetermined ID value, and assertion of an ID value to a first device that is associated with an ID value having a lower priority than the asserted ID value results in the first device withdrawing from contention for the bus, and wherein the device inhibiting apparatus prevents devices that did not participate in the initial arbitration cycle from gaining control of the bus as a result of a subsequent arbitration cycle by asserting a high ID value of higher priority than that associated with any device to all of the devices that did not participate in the initial arbitration.

21. An apparatus according to claim 20 wherein ID values are asserted on the data lines of the bus, and the device inhibiting apparatus comprises a data line controlling mechanism which controls the data lines connecting the devices to the bus so as to selectively prevent the high ID value from reaching devices that participated in the initial arbitration.

22. An apparatus according to claim 21 wherein the device inhibiting apparatus, following each subsequent arbitration after the initial arbitration, thereafter allows the device that gains control of the bus as a result of that particular arbitration to receive the high ID value.

23. An apparatus according to claim 21 wherein the device inhibiting apparatus comprises switches in the data lines connecting each device to the bus which are used to prevent or allow the high ID value from reaching that device.

24. An apparatus according to claim 23 wherein the assertion of one of the data lines corresponds to the assertion of one ID value, and one of the data lines connecting each device to the bus is the high priority data line which, when asserted, corresponds to assertion of the high ID value to that device, and wherein the device inhibiting apparatus further comprises a switch located in the high priority data line of each set of data lines connecting each respective device to the bus.

25. An apparatus according to claim 21 wherein the device inhibiting apparatus controls the data lines connecting the devices to the bus so as to selectively prevent from reaching the bus an ID value asserted by a device that has gained access to the bus as a result of a subsequent arbitration, until all of the devices that participated in the initial arbitration have had access to the bus once following the initial arbitration.

26. An apparatus according to claim 24 wherein the assertion of one of the data lines corresponds to the assertion of one ID value and, for each device, one of the data lines connecting that device to the bus is the self ID data line which, when asserted, corresponds to assertion of that device's own ID value to the bus, and wherein the device inhibiting apparatus further comprises a switch located in the self ID data line of each set of data lines connecting each respective device to the bus.

27. An apparatus according to claim 16 wherein the parallel data bus is a SCSI bus.

28. A parallel data bus arbitration apparatus for conducting arbitration for control of a parallel data bus between a plurality of devices which are connected to the bus and which are capable of gaining control of, and transmitting data over, the bus, each of the devices having associated with it a different predetermined ID value, wherein assertion of an ID value to a first device that is associated with an ID value having a lower priority than the asserted ID value results in the first device withdrawing from contention for the bus, the apparatus comprising:

a monitoring apparatus which monitors an initial arbitration cycle on the bus to determine which of the devices participate in the initial arbitration cycle;

an ID assertion apparatus which asserts a high ID value of higher priority than that associated with any device to all of the devices that did not participate in the initial arbitration; and a data line controller apparatus which controls the data lines connecting the devices to the bus so as to selectively prevent the high ID value from reaching devices that participated in the initial arbitration, wherein the data line controller apparatus, following each subsequent arbitration after the initial arbitration, thereafter allows the device that gains control of the bus as a result of that particular arbitration to receive the high ID value.

* * * * *